US012526578B2

(12) United States Patent
Pan et al.

(10) Patent No.: US 12,526,578 B2
(45) Date of Patent: Jan. 13, 2026

(54) SOUND GENERATING DEVICE

(71) Applicant: GOERTEK INC., Shandong (CN)

(72) Inventors: Quanquan Pan, Shandong (CN); Fengguang Ling, Shandong (CN); Chun Li, Shandong (CN)

(73) Assignee: GOERTEK INC., Weifang (CN)

( * ) Notice: Subject to any disclaimer, the term of this patent is extended or adjusted under 35 U.S.C. 154(b) by 236 days.

(21) Appl. No.: 18/264,256

(22) PCT Filed: Aug. 25, 2021

(86) PCT No.: PCT/CN2021/114492
§ 371 (c)(1),
(2) Date: Aug. 4, 2023

(87) PCT Pub. No.: WO2022/217808
PCT Pub. Date: Oct. 20, 2022

(65) Prior Publication Data
US 2024/0040319 A1 Feb. 1, 2024

(30) Foreign Application Priority Data
Apr. 14, 2021 (CN) ......................... 202110401670.4

(51) Int. Cl.
*H04R 9/02* (2006.01)
*H04R 9/06* (2006.01)

(52) U.S. Cl.
CPC ............... *H04R 9/025* (2013.01); *H04R 9/06* (2013.01)

(58) Field of Classification Search
CPC ...... H04R 9/025; H04R 9/06; H04R 2499/11; H04R 1/2873; H04R 2201/029;
(Continued)

(56) References Cited

U.S. PATENT DOCUMENTS 11,488,570 B2 * 11/2022 Feng ...................... H04R 1/025
2011/0318249 A1 * 12/2011 Nakayama .............. C01B 37/00
423/325
(Continued)

FOREIGN PATENT DOCUMENTS

CN 104219607 A 12/2014
CN 204046809 U 12/2014
(Continued)

OTHER PUBLICATIONS

International Search Report from International Application No. PCT/CN2021/114492 mailed Jan. 13, 2022.

*Primary Examiner* — Angelica M McKinney
(74) *Attorney, Agent, or Firm* — Shih IP Law Group, PLLC

(57) ABSTRACT

Disclosed is a sound generating device. The sound generating device includes a sound generating unit, a plurality of magnetic sound-absorbing particles, and a housing having a cavity, wherein the sound generating unit is accommodated in the cavity, and the sound generating unit divides the cavity into a front cavity and a rear cavity, and the magnetic sound-absorbing particles are filled in the front cavity and/or the rear cavity, and a magnetic attraction force is exerted between the a plurality of magnetic sound-absorbing particles. In the disclosure, magnetic sound-absorbing particles are used to achieve a virtual increase effect in a resonance space of the acoustic rear cavity of the sound generating device, the magnetic sound-absorbing particles attract each other and attached together, thereby restricting the free flow between the particles, reducing the phenomenon that the magnetic sound-absorbing particles break, and effectively protecting the acoustic performance of the sound generating device.

9 Claims, 2 Drawing Sheets

(58) Field of Classification Search
CPC ........ H04R 1/2811; H04R 9/02; H04R 1/025; H04R 1/288; B01J 20/28004; B01D 53/04; C01B 37/00; C01B 39/02
See application file for complete search history.

(56) References Cited

U.S. PATENT DOCUMENTS

| | | | | |
|---|---|---|---|---|
| 2016/0345090 | A1* | 11/2016 | Wilk | B01D 53/04 |
| 2019/0132669 | A1* | 5/2019 | Qin | H04R 1/025 |
| 2019/0203029 | A1 | 7/2019 | Zhang et al. | |
| 2020/0037062 | A1* | 1/2020 | Dai | B01J 20/28004 |

FOREIGN PATENT DOCUMENTS

| | | | | | |
|---|---|---|---|---|---|
| CN | 105621436 | A | | 6/2016 | |
| CN | 205356673 | U | | 6/2016 | |
| CN | 106792389 | A | | 5/2017 | |
| CN | 107534808 | A | | 1/2018 | |
| CN | 207070333 | U | | 3/2018 | |
| CN | 105621436 | B | * | 6/2018 | C01B 39/02 |
| CN | 109721292 | A | | 5/2019 | |
| CN | 110104990 | A | * | 8/2019 | H04R 1/288 |
| CN | 209314028 | U | * | 8/2019 | H04R 1/288 |
| CN | 211240037 | U | | 8/2020 | |
| CN | 113179469 | A | | 7/2021 | |
| CN | 113179470 | A | | 7/2021 | |

* cited by examiner

| speaker module | F0 before reliability experiment | F0 after reliability experiment | ^F0 variation amount | state of sound-absorbing particles |
|---|---|---|---|---|
| magnetic sound-absorbing particles without magnetization processing | 787Hz | 800Hz | 92Hz | particles were worn and partially broken |
| magnetic sound-absorbing particles with magnetization processing | 787Hz | 800Hz | 13Hz | no change |

Fig. 2

SOUND GENERATING DEVICE

TECHNICAL FIELD

The present disclosure relates to a technical field of electroacoustic conversion, specifically, to a sound generating device.

As an important acoustic component of portable electronic devices, the sound generating device is used to achieve the conversion between electrical signal and acoustic signal, and is an energy conversion device. In order to alleviate the acoustic performance degradation caused by the volume reduction of the sound generating device, sound-absorbing particles are filled in the rear cavity of the sound generating device to achieve a virtual increase effect in the resonance space of the rear cavity of the speaker and to improve the acoustic performance. However, the sound-absorbing particles in the rear cavity may move along with the sound generating device or air flow, and it is easy to generate friction and collision between magnetic sound-absorbing particles or between the sound-absorbing particles and the inner wall of the rear cavity, causing the sound-absorbing particles to break and enter the interior of the sound generating unit to result in contamination, which leads to failure of the acoustic performance.

Therefore, it is necessary to provide a new sound generating device to solve the above technical problems.

SUMMARY

A main purpose of the present disclosure is to provide a sound generating device, which intended to solve the problem that the sound-absorbing particles are easily broken, and the broken materials of the sound-absorbing particles enter the interior of the sound generating unit to cause contamination, leading to failure of the acoustic performance thereof.

In order to achieve the above purposes, the sound generating device proposed by the present disclosure includes a sound generating unit, a plurality of magnetic sound-absorbing particles, and a housing having a cavity. The sound generating unit is accommodated in the cavity, and the sound generating unit divides the cavity into a front cavity and a rear cavity, and the magnetic sound-absorbing particles are filled in the front cavity and/or the rear cavity, and a magnetic attraction force is exerted between the a plurality of magnetic sound-absorbing particles.

Preferably, the magnetic sound-absorbing particles include a porous matrix and a ferromagnetic material, and the ferromagnetic material is magnetized to allow the magnetic sound-absorbing particles to have magnetism.

Preferably, the magnetic sound-absorbing particles are subjected to magnetization processing to magnetize the ferromagnetic material within the magnetic sound-absorbing particles.

Preferably, the porous matrix includes at least one of zeolite, activated carbon, porous alumina, porous silica, hydrated aluminosilicate, or metal organic framework material, and the porous matrix has a particle size of 0.1 μm to 80 μm.

Preferably, the ferromagnetic material includes one or more of iron, cobalt, nickel, or lanthanide rare earth metals, and/or one or more of oxides or compounds of iron, cobalt, nickel, or lanthanide rare earth metals, and the ferromagnetic material has a particle size of 0.01 μm to 80 μm.

Preferably, the porous matrix in the magnetic sound-absorbing particles has a mass percentage content of 50% to 96%; the ferromagnetic material has a mass percentage content of 0.01% to 70%.

Preferably, the magnetic sound-absorbing particles further include an adhesive, the adhesive is configured to bond the porous matrix and the ferromagnetic material, and the adhesive has a mass percentage content of 3% to 10%.

Preferably, the sound generating device further includes magnetic-permeable sound-absorbing particles, and the magnetic-permeable sound-absorbing particles are filled in the rear cavity, and a magnetic attraction force is exerted between the magnetic-permeable sound-absorbing particles and the magnetic sound-absorbing particles, and a magnetic attraction force is exerted between the magnetic-permeable sound-absorbing particles in magnetic field of the magnetic sound-absorbing particles.

Preferably, the sound generating device further includes an isolation mesh, and the isolation mesh is arranged in the rear cavity to divide the rear cavity into two portions, and the sound generating unit and the magnetic sound-absorbing particles are arranged on opposite sides of the isolation mesh, respectively, or the isolation mech clads a surface of the sound generating unit and covers at least a gas ventilation region of the sound generating unit; a mesh diameter of the isolation mesh is smaller than a particle diameter of the magnetic sound-absorbing particles.

Preferably, the sound generating device further includes an isolation mesh, and the isolation mesh is arranged in the front cavity to divide the front cavity into two portions, and the sound generating unit and the magnetic sound-absorbing particles are arranged on opposite sides of the isolation mesh, respectively, or the isolation mech clads a surface of the sound generating unit and covers at least a gas ventilation region of the sound generating unit;

A mesh diameter of the isolation mesh is smaller than a particle diameter of the magnetic sound-absorbing particles.

Preferably, the front cavity is filled with sound-absorbing particles.

Preferably, the magnetic sound-absorbing particles have a particle size of 100 μm to 600 μm.

In the technical solution of the present disclosure, magnetic sound-absorbing particles are filled in the rear cavity, to achieve a virtual increase effect in the resonance space of the acoustic rear cavity of the sound generating device by the magnetic sound-absorbing particles; Moreover, magnetic sound-absorbing particles can attract each other under the action of magnetic force, thereby restricting the free flow between the magnetic sound-absorbing particles, avoiding or eliminating friction and collision between magnetic sound-absorbing particles, and thus eliminating the flow noise generated by collisions between the magnetic sound-absorbing particles and reducing the phenomenon that the magnetic sound-absorbing particles break due to collisions between magnetic sound-absorbing particles. In this way, the broken materials of magnetic sound-absorbing particles can be prevented from entering the interior of the sound generating unit to cause contamination, so that the acoustic performance of the sound generating device can be effectively protected.

BRIEF DESCRIPTION OF DRAWINGS

In order to more clearly illustrate the embodiments of the present disclosure or the technical solutions in the related art, the drawings required to be used for the content of the embodiments or the related art will be briefly introduced in the following. Obviously, the drawings in the following description are merely a part of the drawings of the present disclosure and for those of ordinary skill in the art, other drawings can also be obtained from the provided drawings without any creative effort.

FIG. 2 is a table of experimental data on the reliability of magnetic sound-absorbing particles filled in the sound generating device of the present disclosure.

DESCRIPTION OF REFERENCE NUMBERS

Figure 1:
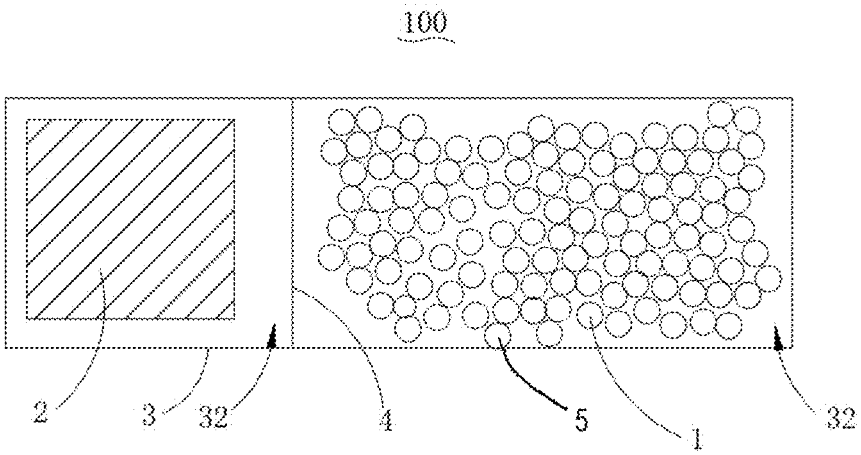
FIG. 1 is a structural schematic diagram of the sound generating device in an embodiment of the present disclosure.

| Reference numbers | Name | Reference numbers | Name |
|---|---|---|---|
| 100 | Sound generating device | 3 | Housing |
| 1 | Magnetic sound-absorbing particle | 32 | Rear cavity |
| 2 | Sound generating unit | 4 | Isolation mesh |

The achievement of the purpose, functional characteristic, and advantages of the present disclosure will be further described with reference to the accompanying drawings in conjunction with embodiments.

DETAILED DESCRIPTIONS

Technical solutions of embodiments of the present disclosure will be described clearly and completely below with reference to the drawings in the embodiments of the present disclosure. Obviously, the described embodiments are only a part of the embodiments of the present disclosure, rather than all the embodiments. All other embodiments obtained by those of ordinary skill in the art without creative efforts based on the embodiments in the present disclosure fall within the protection scope of the present disclosure.

It should be noted that all directional indications (such as up, down, left, right, front, rear, etc.) in embodiments of the present disclosure are only used to explain the relative positional relationship, movement circumstances, and the like between various components in a specific posture (as shown in the accompanying drawings). If the specific posture changes, the directional indication will also change accordingly.

In addition, in the present disclosure, descriptions such as "first", "second", and the like are only used for descriptive purposes, and cannot be understood as indicating or suggesting the relative importance thereof or implying the number of indicated technical features. Therefore, a feature defined by "first" or "second" may explicitly or implicitly include at least one of the features. In the description of the present disclosure, "a plurality of" means at least two, for example, two, three, and the like, unless otherwise explicitly and specifically defined.

In the present disclosure, unless otherwise explicitly described and defined, the terms "connect", "fasten" and the like should be understood in a broad sense. For example, "fasten" may be a fixed connection, a detachable connection, or an integration; it may be a mechanical connection or an electrical connection; it may be directly connected, or indirectly connected through intermediate media, or it may be an internal communication between two components or the interaction relationship between two components, unless otherwise explicitly defined. For those skilled in the art, the specific meaning of the above terms in the present disclosure can be understood according to specific circumstances.

In addition, the technical solutions between various embodiments of the present disclosure can be combined with each other, but must be on the basis that those skilled in the art is capable to achieve. When the combination of technical solutions conflicts or cannot be achieved, it should be considered that such combination of technical solutions does not exist and is not within the protection scope of the present disclosure.

The present disclosure provides a sound generating device.

As shown in FIG. 1, in an embodiment of the present disclosure, the sound generating device 100 includes a sound generating unit 2, a plurality of magnetic sound-absorbing particles 1, and a housing 3 having a cavity. The sound generating unit 2 is accommodated in the cavity, and the sound generating unit 2 divides the cavity into a front cavity and a rear cavity, the magnetic sound-absorbing particles 1 are filled in the front cavity and/or the rear cavity 32, and there is magnetic attraction force between the magnetic sound-absorbing particles 1.

In the above embodiment, magnetic sound-absorbing particles 1 are filled in the rear cavity and/or the rear cavity 32, to achieve a virtual increase effect in the resonance space of the acoustic rear cavity of the sound generating device 100 by the magnetic sound-absorbing particles 1; moreover, magnetic sound-absorbing particles 1 can attract each other under the action of magnetic force, thereby restricting the free flow between the magnetic sound-absorbing particles 1, avoiding or eliminating friction and collision between magnetic sound-absorbing particles 1, and thus eliminating the flow noise generated by collisions between the magnetic sound-absorbing particles 1 and reducing the phenomenon that the magnetic sound-absorbing particles 1 break due to collisions between magnetic sound-absorbing particles 1. In this way, the broken materials of magnetic sound-absorbing particles 1 can be prevented from entering the interior of the sound generating unit 2 to cause contamination, so that the acoustic performance of the sound generating device 100 can be effectively protected.

Here, the magnetic sound-absorbing particles 1 have a spherical or quasi spherical shape and have a diameter of 100 μm to 600 μm. The magnetic sound-absorbing particles 1 may be filled only in the rear cavity 32, may be filled only in the front cavity, or may be filled in both the rear cavity 32 and the front cavity. When the sound-absorbing particles 1 are only filled in the front cavity, the high-frequency performance of the sound generating device can be adjusted. When the sound-absorbing particles 1 are only filled in the rear cavity, the low-frequency performance of the sound generating device can be adjusted. When the sound-absorbing particles 1 are filled in both the front cavity and the rear cavity, both the high-frequency performance and low-frequency performance can be adjusted. For convenience of description, various embodiments will be illustrated in the below by taking the case that the magnetic sound-absorbing particles 1 are filled in the rear cavity 32 as an example. The diameter of the magnetic sound-absorbing particle 1 conforms to the volume of the rear cavity 32, and the diameter of the magnetic sound-absorbing particle 1 ranges from 100 μm to 600 μm, so as to facilitate to manufacture and form particles when manufacturing magnetic sound-absorbing particles 1, and to meet the requirements for the filling rate of the magnetic sound-absorbing particles 1 in the rear cavity 32.

In one embodiment, the magnetic sound-absorbing particles 1 include a porous matrix and a ferromagnetic material that are interconnected with each other, the ferromagnetic material is magnetized to allow the magnetic sound-absorbing particles 1 to have magnetism. Powder materials can be selected as the ferromagnetic material, the powdery porous matrix and ferromagnetic material are uniformly mixed and connected to form the magnetic sound-absorbing particles 1, and rapid attraction and desorption property to the gas in the rear chamber by the special physical pore structure inside the porous material is utilized to achieve a virtual increase in the acoustic rear cavity resonance space of the speaker. Of course, integrity materials can also be selected as the ferromagnetic material, the porous matrix is clad on the outer circumference of the ferromagnetic material to form the magnetic sound-absorbing particles 1. Before magnetization, the manufactured magnetic sound-absorbing particles 1 do not have magnetism to facilitate to be subpackaged and filled into the rear cavity 32; The magnetic sound-absorbing particles 1 are subjected to magnetization processing after filling in the rear cavity 32. The ferromagnetic material is magnetized to have magnetism after being subjected to magnetization processing, causing the magnetic sound-absorbing particles 1 to be attracted together under the action of magnetic force. The porous matrix and the ferromagnetic material can be directly connected by an adhesive to form the magnetic sound-absorbing particles 1. In other embodiments, other processing methods may also be used to connect the porous matrix and the ferromagnetic material together, for example, cladding the outside of the ferromagnetic material with the porous matrix or cladding the outside of the porous matrix with the ferromagnetic material.

In a reliability verification experiment, two groups of sound generating devices were arranged for reliability experiment. The two groups of sound generating devices were continuously powered on to operate for 144 h at 70° C. with a voltage of 3.18V and a powdery noise signal. After the experiment, the resonance frequency FO of the sound generating device was measured, and the magnetic sound-absorbing particles were disassembled and observed for whether there was breakage phenomenon. The difference between the two groups of sound generating devices was that, the magnetic sound-absorbing particles 1 filled in a group of sound generating device were not subjected to magnetization processing (i.e., there was no magnetic attraction force between the magnetic sound-absorbing particles in the rear cavity), whereas the magnetic sound-absorbing particles 1 filled in the other group of sound generating device were subjected to magnetization processing. Please refer to FIG. 2, the first group of sound generating device had a resonance frequency of 787 Hz before the reliability experiment, and had a resonance frequency of 879 Hz after completing the reliability experiment, the disassembled magnetic sound-absorbing particles 1 were worn and partially damaged. The second group of sound generating device had a resonance frequency of 787 Hz before and after the reliability experiment, and had a resonance frequency of 800 Hz after completing the reliability experiment, and the disassembled magnetic sound-absorbing particles had no significant change. That is, by filling the magnetic sound-absorbing particles in the rear cavity and magnetizing the magnetic sound-absorbing particles to fill the rear cavity with the magnetic sound-absorbing particles to be magnetized and attracted with each other, the present disclosure effectively restricted the free flow between the magnetic sound-absorbing particles 1, avoided or eliminated the friction and collision between the magnetic sound-absorbing particles 1, and eliminated the flow noise generated by the collision between the sound-absorbing particles and the cavity wall, as well as the flow noise generated by the collision between the conventional sound-absorbing particles, and reduced the phenomenon that magnetic sound-absorbing particles 1 break due to collisions between magnetic sound-absorbing particles 1, and had a small amount of resonance frequency variation before and after reliability experiment, and effectively protected the acoustic performance of the sound generating device 100.

In addition, the magnetic sound-absorbing particle 1 also includes an adhesive, the adhesive is used to bond the powdery porous matrix and the ferromagnetic material. The porous matrix and the ferromagnetic material are bonded together through the adhesive, which provides appropriate viscosity, facilitates the forming of the magnetic sound-absorbing particle 1, and is beneficial for improving the mechanical strength of the preform after formation, prevents the ferromagnetic material from separating from the porous matrix, and ensures the magnetic durability of the magnetic sound-absorbing particle 1. The adhesive may be one or more of polyacrylic acid, polyurethane, or polyvinyl acetate adhesives. The mass percentage content of the adhesive is 3% to 10%, so as to ensure that the porous matrix and ferromagnetic materials can be bonded together. However, during the process of manufacturing, excessive adhesive may block the gaps on the porous matrix, therefore controlling the amount of adhesive is beneficial for controlling the size and quantity of pores in the magnetic sound-absorbing particle 1.

The porous matrix includes at least one of zeolite, activated carbon, porous alumina, porous silica, hydrated aluminosilicate, or metal organic framework material, and the porous matrix has a particle size of 0.1 μm to 80 μm. The metal organic framework material is composed of metal ions and organic small molecule ligand to form a porous material with a periodic network structure. The metal organic framework material has micropores with a pore size range of 0.3 to 0.8 nanometers and mesopores with a pore size range of 2 to 40 nanometers therein. Here, the metal ions include ion of at least one element of copper, iron, zinc, manganese, indium, cadmium, or cobalt; the small molecule ligand includes at least one of formic acid, malonic acid, tartaric acid, or citric acid.

Ferromagnetic material includes one or more of iron, cobalt, nickel, or lanthanide rare earth metals, and/or one or more oxides of iron, cobalt, nickel, or lanthanide rare earth metals, and the ferromagnetic material has a particle size of 0.01 μm to 80 μm. The ferromagnetic material made of the above materials may exhibit magnetism under the action of an external magnetic field, and the formed magnetic field strength is stable and difficult to demagnetize. Ferromagnetic material may specifically be selected from iron powder, nickel powder, cobalt powder, ferric oxide powder, ferrite powder, aluminum cobalt nickel alloy powder, neodymium iron boron powder, iron chromium cobalt alloy powder, samarium cobalt alloy powder, etc.

In the magnetic sound-absorbing particle 1, the mass percentage content of the porous matrix is 50% to 96%, the mass percentage content of the ferromagnetic material is 0.1% to 70%, and the mass percentage content of the adhesive is 3% to 10%. In an embodiment, in the magnetic sound-absorbing particle 1, the mass percentage content of the porous matrix is 72%, the mass percentage content of the ferromagnetic material is 20%, and the mass percentage content of the adhesive is 8%. The mass percentage content of the porous matrix and the mass percentage content of the ferromagnetic material in the magnetic sound-absorbing particle 1 are balanced to ensure the sound-absorbing ability of the magnetic sound-absorbing particle 1, to control the magnetic field strength of the magnetic sound-absorbing particle 1 after being magnetized, and to ensure that the porous matrix and the ferromagnetic material can be bonded and fastened.

In an embodiment, in the magnetic sound-absorbing particle 1, the mass percentage content of the porous matrix is 50%, the mass percentage content of the ferromagnetic material is 40%, and the mass percentage content of the adhesive is 10%. By increasing the mass percentage content of the ferromagnetic material as much as possible, the magnetic field strength formed by a single magnetic sound-absorbing particle 1 after being magnetized is improved, so as to ensure a tight connection between two adjacent magnetic sound-absorbing particles 1.

In an embodiment, in the magnetic sound-absorbing particle 1, the mass percentage content of the porous matrix is 94%, the mass percentage content of the ferromagnetic material is 1%, and the mass percentage content of the adhesive is 5%. When the volume of the rear cavity 32 is relatively small, the mass percentage content of the porous matrix can be increased, and the virtual increase effect in the resonance space of the rear cavity of the sound generating device 100 can be enhanced, so as to effectively reduce the resonant frequency of the speaker.

In addition, the sound generating device 100 further includes magnetic-permeable sound-absorbing particles 5, the magnetic-permeable sound-absorbing particles 5 are filled in the rear cavity 32, and there is a magnetic attraction force between the magnetic-permeable sound-absorbing particles 5 and the magnetic sound-absorbing particles 1, and there is a magnetic attraction force between the magnetic-permeable sound-absorbing particles 5 in the magnetic field formed by the magnetic sound-absorbing particles 1. Both the magnetic sound-absorbing particles 1 and the magnetic-permeable sound-absorbing particles 5 have sound-absorbing particles functioned to increase the resonance space of the rear cavity, and the magnetic sound-absorbing particles 5 are doped with magnetic-permeable metal powder or magnetic-permeable metal oxide powder, so that the magnetic-permeable sound-absorbing particles 5 can be attracted to the magnetic sound-absorbing particles 1 or attracted to each other in the magnetic field formed by the magnetic sound-absorbing particles 1, thereby restricting the free flow between the sound-absorbing particles, avoiding or eliminating friction and collision between the sound-absorbing particles, eliminating the flow noise generated by collisions between the sound-absorbing particles, and reducing the phenomenon the magnetic sound-absorbing particles break due to collisions between magnetic sound-absorbing particles. In this way, the broken materials of magnetic sound-absorbing particles can be prevented from entering the interior of the sound generating unit to cause contamination, so that the acoustic performance of the sound generating device 100 can be effectively protected.

Here, the sound generating device 100 further includes an isolation mesh 4, and the isolation mesh 4 is arranged in the rear cavity 32 to divide the rear cavity 32 into two portions, and the sound generating unit 2 and the magnetic sound-absorbing particles 1 are arranged on opposite sides of the isolation mesh 4, respectively; or the isolation mesh 4 clads a surface of the sound generating unit 2 and covers at least a gas ventilation region of the sound generating unit 2; the mesh diameter of the isolation mesh 4 is smaller than the particle diameter of the magnetic sound-absorbing particles 1. The mesh diameter of the isolation mesh 4 is smaller than the particle diameter of the magnetic sound-absorbing particles 1. By arranging the isolation mesh 4 to isolate the magnetic sound-absorbing particles from the sound generating unit, gas can enter the rear chamber 32 through the isolation mesh 4, whereas the magnetic sound-absorbing particles 1 are blocked in the rear chamber 32 by the isolation mesh 4, preventing the magnetic sound-absorbing particles 1 from entering the chamber where the sound generating unit 2 is positioned and causing an impact on the sound generating unit 2. By setting the size of the pores on the isolation mesh 4, it is also possible to further restrict the partially broken magnetic sound-absorbing particles 1 from entering the chamber where the sound generating unit 2 is positioned, thereby further ensuring the acoustic performance of the entire sound generating device 100.

The housing 3 is provided with a leakage hole that communicates the rear cavity 32 with the outside. The leakage hole communicates the rear chamber 32 with the exterior of the housing 3 to balance the air pressure inside the rear chamber 32.

When manufacturing the magnetic sound-absorbing particle 1, a porous material, a ferromagnetic material, and an adhesive are mixed in a predetermined proportion to form a wet material; The mixture is manufactured into a plurality of uniformly sized particle embryos, and the particle embryos are dried to obtain magnetic the sound-absorbing particles 1.

Here, it is possible to uniformly disperse the porous material and the ferromagnetic material into water in a determined proportion to form a mixture at first, and then add an adhesive to the mixture in a predetermined proportion and stir uniformly to form a wet material; Of course, it is also possible to replace water with other solvents, and mixing the porous material and the ferromagnetic material at first is beneficial for uniform mixing of the porous material and the ferromagnetic material. Alternatively, it is also possible to directly add the porous material and the ferromagnetic material into the adhesive aqueous solution and perform mixing and stirring to form a wet material.

The particle embryo may be formed by agglomeration granulation, extrusion granulation, spray granulation, etc., and then, the particle embryo having a particle size of 100 μm to 600 μm may screened out to be dried to obtain the magnetic sound-absorbing particle 1. It is also possible to fill the mixture into the mold to form the particle embryo having a particle size of 100 μm to 600 μm, and dry the obtained particle embryo to obtain the magnetic sound-absorbing particle 1.

In an embodiment, dry zeolite material and iron(II,III) oxide material are added to solvent water in a determined proportion, and mechanically stirred for 1.5 h at 500 rpm, to obtain a uniformly dispersed mixed suspension solution; polyacrylic acid adhesive is added to the mixture and mechanically stirred for 0.5 h at 500 rpm to form a wet material. Here, the added mass of zeolite is 27% relative to the total mass of the above-described slurry; the added mass of the ferric oxide material is 2.8% relative to the total mass of the above-described slurry; the added mass of polyurethane is 0.2% relative to the total mass of the above-described mixed suspension solution. The mass of solids in the slurry is 30% relative to the total mass of the above-described mixed suspension solution.

Uniformly dispersed wet materials are added into the spray drying granulator, the inlet temperature of the spray drying granulator is set to 140-160° C., the outlet temperature of the spray drying granulator is set to 100-110° C., the spray pressure is set to 0.5 MPa and drying and granulating is performed to obtain preliminarily formed particles.

The preliminarily formed particles are heated, solidified, and dried for 0.5 h in an oven at 120° C. to obtain dry particles. The above-described dried particles are screened out by using a sieve to obtain magnetic sound-absorbing particles 1 having a particle size of about 100 μm to 600 μm.

The magnetic sound-absorbing particles 1 are filled into the rear cavity 32 of the sound generating device 100 to be assembled; the magnetic sound-absorbing particles 1 filled in the rear cavity 32 are subjected to magnetization processing to manufacture the sound generating device 100 as described above.

When manufacturing the magnetic sound-absorbing particle 1, doping the ferromagnetic material during manufacture of the magnetic sound-absorbing particle 1 enables the manufactured magnetic sound-absorbing particles 1 to be magnetized and thus to have magnetism. The rear cavity 32 of the sound generating device 100 formed in this way is filled with the magnetic sound-absorbing particles 1 therein, the magnetic sound-absorbing particles 1 can be attracted to each other under the action of magnetic force, thereby restricting the free flow between particles, avoiding or eliminating friction and collision between magnetic sound-absorbing particles 1, eliminating the flow noise generated by the collision between magnetic sound-absorbing particles 1, and reducing the phenomenon that the magnetic sound-absorbing particles 1 break due to collisions between magnetic sound-absorbing particles 1. In this way, the broken materials of magnetic sound-absorbing particles 1 can be prevented from entering the interior of the sound generating unit 2 to cause contamination, so that the acoustic performance of the sound generating device 100 can be effectively protected.

The above is only a preferred embodiment of the present disclosure, and is not intended to limit the patent scope of the present disclosure. Under the inventive concept of the present disclosure, equivalent structural changes made using the description and accompanying drawings of the present disclosure, or direct/indirect disclosures in other related technical fields, are all included in the patent protection scope of the present disclosure.

What is claimed is:

1. A sound generating device comprising a sound generating unit, a plurality of magnetic sound-absorbing particles, and a housing having a cavity, wherein the sound generating unit is accommodated in the cavity, the sound generating unit divides the cavity into a front cavity and a rear cavity, and the magnetic sound-absorbing particles are filled in the rear cavity, and wherein a first magnetic attraction force is exerted between the plurality of magnetic sound-absorbing particles, wherein the sound generating device further comprises magnetic-permeable sound-absorbing particles, wherein the magnetic-permeable sound-absorbing particles are filled in the rear cavity, and wherein a second magnetic attraction force is exerted between the magnetic-permeable sound-absorbing particles and the magnetic sound-absorbing particles, and a third magnetic attraction force is exerted between the magnetic-permeable sound-absorbing particles in magnetic field of the magnetic sound-absorbing particles.

2. The sound generating device according to claim 1, wherein the magnetic sound-absorbing particles comprise a porous matrix and a ferromagnetic material, and the ferromagnetic material is magnetized to allow the magnetic sound-absorbing particles to have magnetism.

3. The sound generating device according to claim 2, wherein the magnetic sound-absorbing particles are subjected to magnetization processing to magnetize the ferromagnetic material within the magnetic sound-absorbing particles.

4. The sound generating device according to claim 2, wherein the porous matrix comprises at least one selected from a group consisting of zeolite, activated carbon, porous alumina, porous silica, hydrated aluminosilicate, and metal organic framework material, and the porous matrix has a particle size of 0.1 μm to 80 μm.

5. The sound generating device according to claim 2, wherein the ferromagnetic material comprises one or more selected from a group consisting of iron, cobalt, nickel, and lanthanide rare earth metals, and/or one or more selected from a group consisting of oxides or compounds of iron, cobalt, nickel, and lanthanide rare earth metals, and the ferromagnetic material has a particle size of 0.01 μm to 80 μm.

6. The sound generating device according to claim 2, wherein the porous matrix in the magnetic sound-absorbing particles has a mass percentage content of 50% to 96% and the ferromagnetic material has a mass percentage content of 0.01% to 70%.

7. The sound generating device according to claim 2, wherein the magnetic sound-absorbing particles further comprise an adhesive configured to bond the porous matrix and the ferromagnetic material, and the adhesive has a mass percentage content of 3% to 10%.

8. The sound generating device according to claim 1, wherein the sound generating device further comprises an isolation mesh, wherein the isolation mesh is arranged in the rear cavity to divide the rear cavity into two portions, and the sound generating unit and the magnetic sound-absorbing particles are arranged on opposite sides of the isolation mesh, respectively, or the isolation mech clads a surface of the sound generating unit and covers at least a gas ventilation region of the sound generating unit; and wherein the isolation mesh has a mesh diameter smaller than a particle diameter of the magnetic sound-absorbing particles.

9. The sound generating device according to claim 1, wherein the magnetic sound-absorbing particles have a particle size of 100 μm to 600 μm.

* * * * *